US010552001B1

(12) United States Patent
Lin

(10) Patent No.: US 10,552,001 B1
(45) Date of Patent: Feb. 4, 2020

(54) WINDOW SWITCHING FOR NETWORKED COMPUTING SESSIONS

(71) Applicant: Amazon Technologies, Inc., Seattle, WA (US)

(72) Inventor: Yang Lin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/427,669

(22) Filed: Feb. 8, 2017

(51) Int. Cl.
*G06F 3/0482* (2013.01)
*G06F 3/14* (2006.01)
*H04L 29/06* (2006.01)
*H04L 29/08* (2006.01)

(52) U.S. Cl.
CPC .......... *G06F 3/0482* (2013.01); *G06F 3/1454* (2013.01); *H04L 65/601* (2013.01); *G06F 2203/04803* (2013.01); *H04L 67/02* (2013.01); *H04L 67/42* (2013.01)

(58) Field of Classification Search
CPC ..................... G06F 3/04892; G06F 3/0482
See application file for complete search history.

(56) References Cited

U.S. PATENT DOCUMENTS 6,412,073 B1 * 6/2002 Rangan ............. G06F 17/30867
705/14.47
6,735,601 B1 * 5/2004 Subrahmanyam ........ G06F 8/61
8,862,762 B1 * 10/2014 Motrenko ............... H04L 51/10
709/230
9,819,715 B2 * 11/2017 Scurtu ..................... H04L 65/80
2008/0192003 A1 * 8/2008 Kondo .................. G06F 3/0219
345/156
2009/0138819 A1 * 5/2009 Yu ......................... G06F 3/0481
715/802
2010/0077347 A1 * 3/2010 Kirtane .................. G06F 9/451
715/803
2010/0146449 A1 * 6/2010 Brown ................ G06F 9/45512
715/835

(Continued)

OTHER PUBLICATIONS

Screen captures from YouTube clip entitled "How to Enable Tab Preview Feature on Firefox—2016t" 3 pages, published on Jul. 29, 2016 by Trick and Tips. Retrieved from Internet <https://www.youtube.com/watch?v=JZafbkX7wxA> (Year: 2016).*

(Continued)

*Primary Examiner* — Abdullah Al Kawsar
*Assistant Examiner* — Kenny Nguyen
(74) *Attorney, Agent, or Firm* — BakerHostetler

(57) ABSTRACT

Image data associated with a number of launched application windows may be streamed from a remote service to client over a network and displayed by a browser application at the client. In some examples, a control for switching between applications may be provided by the browser application and may not be included in the image data that is streamed from the remote service. In some examples, while a first application window is being displayed, the control may be selected to allow switching the display to another application window. Upon selection of this control, selectable representations, such as thumbnail images, of the launched application windows may be generated and displayed. Selection of a particular representation may cause the display to switch to an application window associated with the selected representation.

15 Claims, 17 Drawing Sheets

(56) References Cited

U.S. PATENT DOCUMENTS

| | | | | |
|---|---|---|---|---|
| 2012/0054648 A1* | 3/2012 | Morris | ............... | G06F 3/0481 |
| | | | | 715/764 |
| 2013/0042271 A1* | 2/2013 | Yellin | ............... | H04N 5/765 |
| | | | | 725/41 |
| 2015/0149951 A1* | 5/2015 | Magistrado | ......... | G06F 17/2247 |
| | | | | 715/777 |
| 2015/0207800 A1* | 7/2015 | Jitkoff | ............... | H04L 63/102 |
| | | | | 726/4 |
| 2017/0065887 A1* | 3/2017 | Colenbrander | ....... | A63F 13/355 |
| 2017/0118199 A1* | 4/2017 | Albisu | ............... | H04L 63/0272 |
| 2017/0364949 A1* | 12/2017 | Vandusen | ......... | G06F 17/30876 |
| 2018/0295421 A1* | 10/2018 | Lim | ............... | G06F 3/0482 |

OTHER PUBLICATIONS

Gordon, Whitson. "Enable Thumbnails in Firefox's "List All Tabs" Menu." lifehacker, Jun 20, 2011. Retrieved from Interent <https://lifehacker.com/5813650/enable-thumbnails-in-firefoxs-list-all-tabs-menu> (Year: 2011).*

Agarwal, Sandeep. "Activate Windows Like Alt + Tab Thumbnail Preview Toggling for Firefox Tabs." Guiding Tech, Nov. 14, 2012. Retrieved from Internet <https://www.guidingtech.com/16986/firefox-tabs-thumbnail-preview-alt-tab-toggling/> (Year: 2012).*

\* cited by examiner

US 10,552,001 B1

WINDOW SWITCHING FOR NETWORKED COMPUTING SESSIONS

BACKGROUND

The use of remote networked computing services to provide various computing resources has become increasingly popular in recent years. For example, in some cases, cloud and other remote services may be employed to stream image data associated with a number of remotely launched and executed applications that may be operated by a user at a networked client. For example, applications may be launched and executed at the remote service, and output from the applications, such as user interface displays, may be streamed over a network to the client. In some cases, the application user interfaces may then be displayed in respective application windows at the client using a client web browser. The user may interact with the applications and provide control input to the applications that is transmitted back to the remote services over the network.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
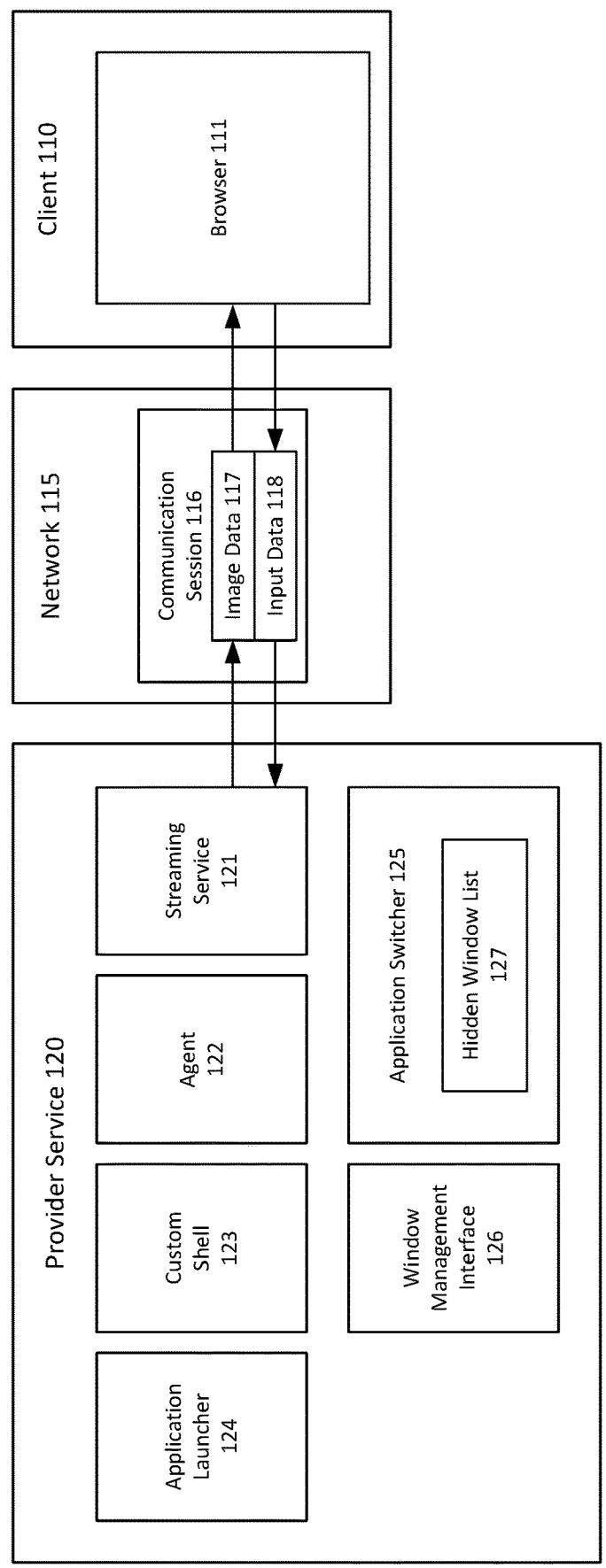
FIG. 1 is a diagram illustrating an example window switching system for a networked computing session that may be used in accordance with the present disclosure.

Techniques for window switching for networked computing sessions are described herein. In some examples, a client computing device and a remote service may establish a computing session in which image data associated with various computing applications is transmitted from the remote service to the client. For example, a user may send requests, via a client web browser, to launch applications, such as word processing applications, spreadsheet applications, email applications, mathematics applications, and many others. These applications may be launched and executed at the remote service, and output from the applications, such as user interface displays, may be streamed over a network to the client. In some cases, the application user interfaces may then be displayed in respective application windows at the client using the client web browser. The user may interact with the applications and provide control input to the applications (e.g., mouse, keyboard, etc.) that is transmitted back to the remote services over the network.

In some examples, the streamed user interface image data that is transmitted to the client may differ in various aspects from traditional user interfaces that are generated and displayed on a single device, such as desktop or laptop computer. For example, traditional (e.g., single device) user interfaces may typically include a taskbar or other control that allows users to easily switch between launched applications. Such a taskbar may often be positioned at the bottom of a traditional user interface and may often include icons associated with various respective launched applications. In some examples, to switch from one launched application to another, a user may simply select a task bar icon corresponding to the application to which the user wishes to switch, and a window for the switched-to application may then be responsively displayed in the user interface. By contrast, in some examples, the streamed user interface image data may not include a taskbar or other control that allows the user to easily switch between launched applications. In some cases, this may be done for various reasons, such as to easily regulate and limit which applications the remote service wishes to make available to particular users and/or clients.

User interfaces for launched applications may be displayed using respective application windows. The term window, as used herein, refers to a graphical control that displays a graphical interface of an associated application. As used herein, windows may be employed in multiple different types of operating systems and are not limited to any particular type of operating system from any particular operating system developer or provider. In some cases, a particular networked computing session may, at a given time, include multiple launched application windows, and a user may wish to switch from a current displayed application window to another launched application window, such as an application window that is currently hidden. However, as set forth above, in some examples, because the streamed user interface may not include a taskbar or other similar control, the streamed user interface may, in some examples, not offer a mechanism for the user to easily switch between application windows. For these and other reasons, in some examples, a control for switching between application windows may be provided by the client browser application. In particular, in some cases, the control for switching between applications may not be included in the image data that is streamed from the remote service.

In some examples, upon receiving a selection of this browser application switching control, the client browser application may generate input data indicating an application switching request for transmission to the remote service. In one specific example, the input data may include key data, such as relating to a hot-key combination (e.g., Ctrl+Shift+Alt+F10, etc.) and may be transmitted to the remote service using a built-in channel (e.g., a key input channel) of a streaming protocol that is employed for the computing session. In some examples, this input data may be received by the remote service and provided to an application switching component that executes at the remote service. In some examples, the application switching component may process the received input data by determining the current launched application windows for the computing session, for example including both displayed and hidden application windows. In some cases, in order to determine the current hidden application windows, the application switching component may maintain a list of hidden application windows for the computing session, and the application switching component may add application windows to this list when they become hidden.

In some examples, upon determining the current launched application windows, the application switching component may request selectable representations of the launched application windows for display to the user. In some cases, the application switching component may provide identification information for the launched application windows to a component that generates the representations, such as a window management interface, for example via an application programming interface (API) exposed by the window management interface. In some examples, the representations of the launched application windows may include thumbnail or other reduced size images of the respective launched application windows. Also, in some examples, the application switching component may determine not to request representations for certain launched application windows, such as pop-up windows, error message windows, and other windows that the user may be considered unlikely to switch to.

Upon generation of the representations of the application windows, the application switching component may generate a display of the representations, such as a display in which the representations are shown in a grid, tile, flip or other layout. The display of the representations may then be transmitted from the remote service to the client for display by the client browser application. Upon display of the representations to the user at the client, the user may select a representation of an application window to which the user wishes to switch, such as by clicking on the selected representation. Input data indicating the selection of this representation may then be transmitted to the remote service. Upon receipt of this input data, the remote service may generate a subsequent display including the application window corresponding to the selected representation. This display may then be then be transmitted from the remote service to the client for display by the client browser application. The user may then interact with the selected displayed application window to perform functionality associated with the respective application.

FIG. 1 is a diagram illustrating an example window switching system for a networked computing session that may be used in accordance with the present disclosure. As shown in FIG. 1, client 110, such as a desktop, laptop, tablet, phone, or other computing device, communicates with provider service 120 over at least one network 115. Network 115 may include at least one local area network (LAN) and/or at least one wide area network (WAN) such as the Internet. In one specific example, provider service 120 may be a cloud service that operates one or more data centers or other large-scale collections of computing resources, such as virtual machines, servers and/or other computing resources. As also shown in FIG. 1, a communication session 116 is established between client 110 and provider service 120. As part of the communication session 116, image data 117 may be streamed, for example from streaming service 121 of provider service 120 to client 110. Streaming of data may refer to a technique in which portions of data may be received and presented (e.g., displayed) while subsequent portions of the data continue to be transmitted. The streamed image data may be associated with various applications that may be launched and executed at provider service 120 for use by client 110. In some examples, these applications may include word processing applications, spreadsheet applications, email and communication applications, and many other types of applications. The image data 117 may include, for example, pixel value data corresponding to rendered images of the user interfaces of the launched and executed applications.

In the example of FIG. 1, a browser 111, such as a web or other browsing application, may be employed to manage the communication session 116 at client 110. For example, the browsing application may 111 may be used to communicate with the provider service 120 via transmission of input data 118, such as to initiate the communication session 116, to request launch of the streamed applications, to display and enable interaction with the streamed applications, to switch between streamed applications (as described in detail below), and for other operations.

As shown in FIG. 1, provider service 120 executes a custom shell 123 on which the streamed applications may be launched and executed. In one specific example, provider service 120 may execute a number of instances of custom shell 123, such as with each custom shell instance executing on a respective virtual machine instance or other computing resource instance. As described above, in some examples, the user interface provided by the custom shell 123 may differ from traditional (e.g., single-device) user interfaces, such as may be commonly provided on a desktop or laptop computer. For example, traditional user interfaces may typically include a taskbar or other control that allows users to easily switch between launched applications. By contrast, in some examples, the custom shell 123 may provide a custom user interface that may not include a taskbar or other control that allows the user to easily switch between launched applications. As set forth above, this may be done for various reasons, such as to easily regulate and limit which applications the remote service wishes to make available to particular users and/or clients.

Figure 2:
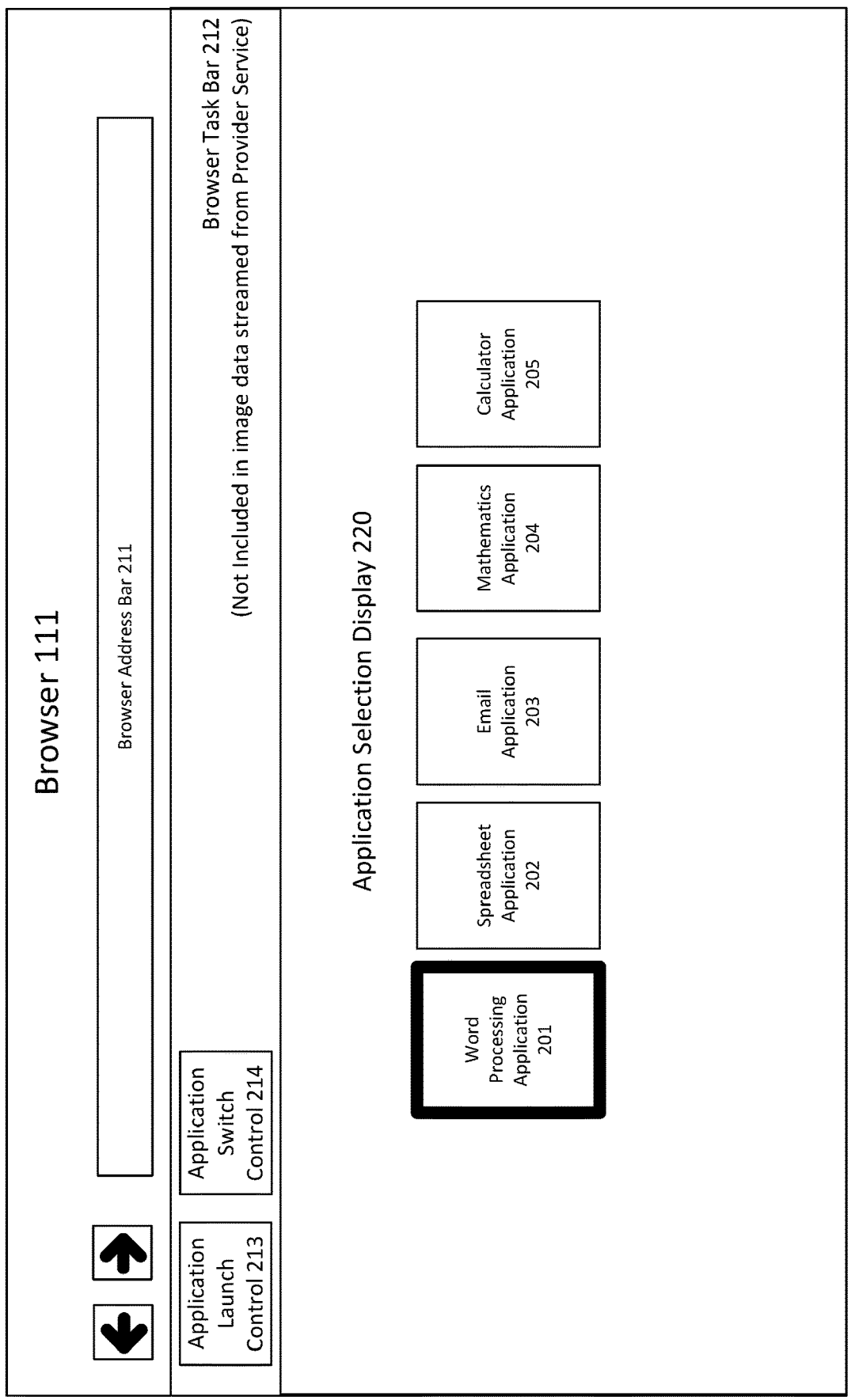
FIG. 2 is diagram illustrating an example application selection display that may be used in accordance with the present disclosure.

In some examples, a user may employ browser 111 to connect with provider service 120 and establish communication session 116, for example by entering an Internet Protocol (IP) address or other address associated with the provider service 120 into an address bar or other input field of the browser 111. Also, in some cases, the user may be prompted to enter identity authentication information, such as a username and password, which may be transmitted to the provider service 120, such as to verify the identity of the user and to determine various applications and other computing resources that are accessible to the user. In some examples, the browser 111 may then display an interface that allows the user to select an application for launching and execution by the provider service 120. Referring now to FIG. 2, an example application selection display 220 will now be described in detail. As shown in FIG. 2, browser 111 includes a browser address bar 211, such as may be used to enter an address associated with the provider service 120 as described above. Additionally, in the example of FIG. 2, browser 111 displays an application selection display 220, which includes icons 201-205 associated with various applications from provider service 120 that are accessible to client 110. In this example, icon 201 is for a word processing application, icon 202 is for a spreadsheet application, icon 203 is for an email application, icon 204 is for a mathematics application, and icon 205 is for a calculator application. Icons 201-205 are each selectable to launch a respective application. In the example of FIG. 2, the user has selected icon 201 to launch the word processing application.

Selection of an application icon 201-205 may cause the browser 111 to transmit an application launch request including an identifier associated with the respective selected application to the provider service 120. For example, upon selection of icon 201, the browser 111 may transmit an application launch request including an identifier associated with the respective word processing application to the provider service 120. At the provider service 120, the transmitted application launch request including the application identifier may be received by streaming service 121 of FIG. 1, which, in turn, may provide the application launch request and the application identifier to agent 122, for example using an Inter-Process Communication (IPC) channel such as named pipe. Agent 122 is a process executing at provider service 120 that may retrieve metadata associated with the provided application identifier, such as an executable path for selected application (e.g., the word processing application). The agent 122 may then send the application launch request along with the retrieved executable path and/or other information for the selected application to the custom shell 123. The custom shell 123 may, in turn, process the application launch request by, for example, interacting with application launcher 124. Application launcher 124 is a library that may that may encapsulate native functions, such as related to job and process management. In some examples, custom shell 123 may invoke an application start process of application launcher 124 with the retrieved executable path and/or other information for the selected application to be launched. The application start process may then launch and initiate execution of the selected application within custom shell 123, and a user interface for the selected application may then be generated. Image data, such as pixel value data, associated with a rendered display of the launched application may then be transmitted by streaming service 121 to client 110 for display by browser 111.

Figure 3:
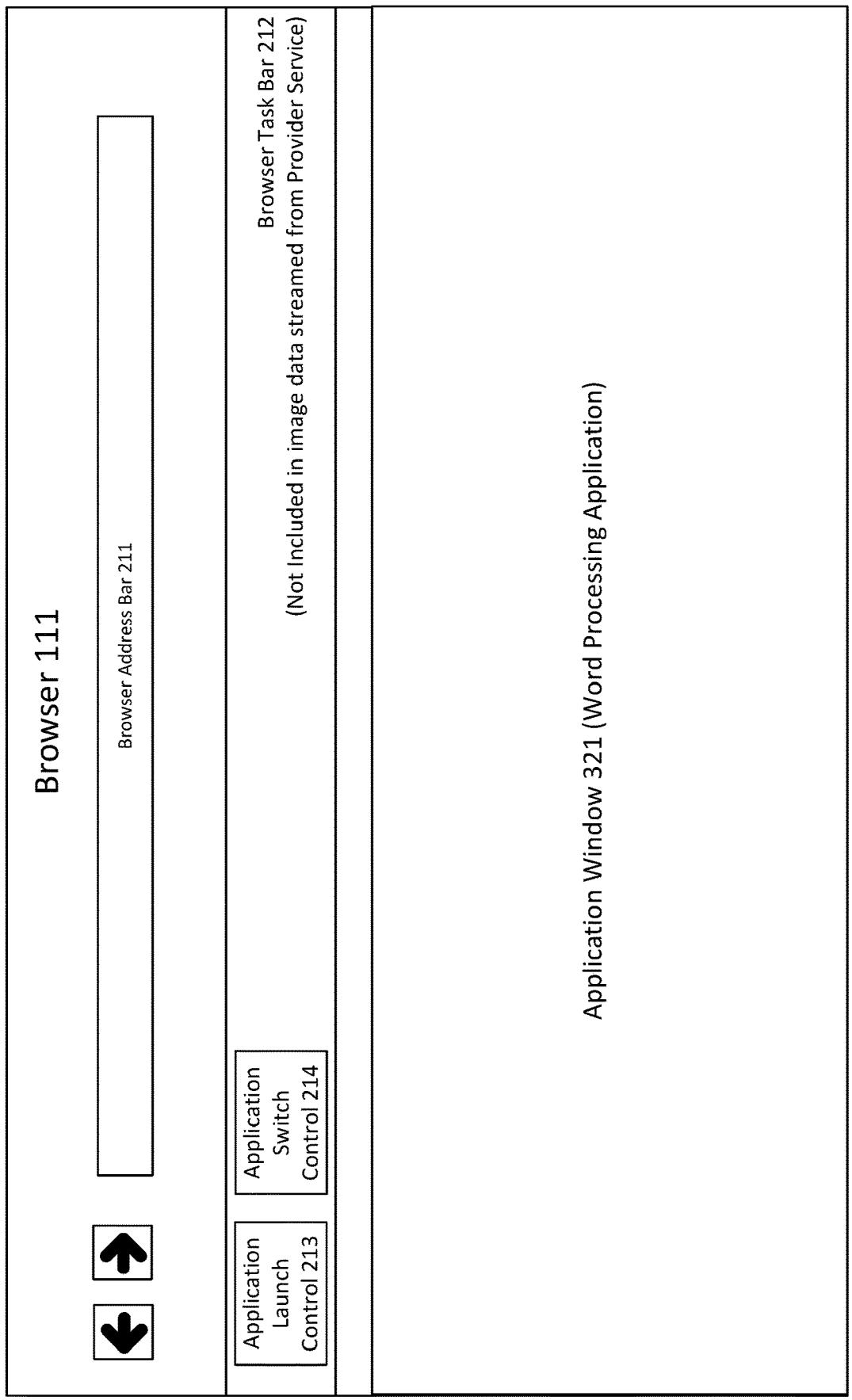
FIG. 3 is diagram illustrating an example launched word processing application window that may be used in accordance with the present disclosure.

In particular, in some examples, custom shell 123 may display a user interface for the launched application within a respective launched application window. Image data for displaying the respective application window may then be transmitted to client 110 for display by browser 111. Referring now to FIG. 3, an example application window 321 is shown for the launched and executing word processing application. As shown, application window 321 is displayed within the browser 111. Upon display of application window 321, the user may employ various input controls (e.g., mouse, keyboard, touchscreen, etc.) to provide input to the word processing application, such as by typing text for display and editing within the application window 321, selecting various word processing application controls (e.g., bold, underline, italic, etc.) that may be displayed within application window 321, and the like. This user input may be transmitted, as input data 118, from client 110 to provider service 120, for example for processing by the word processing application executing at provider service 120. For example, in some cases, the display of the application window may be updated based on this control input, and image data corresponding to the updated application window may then be transmitted to client 110 for display by browser 111.

Figure 4:
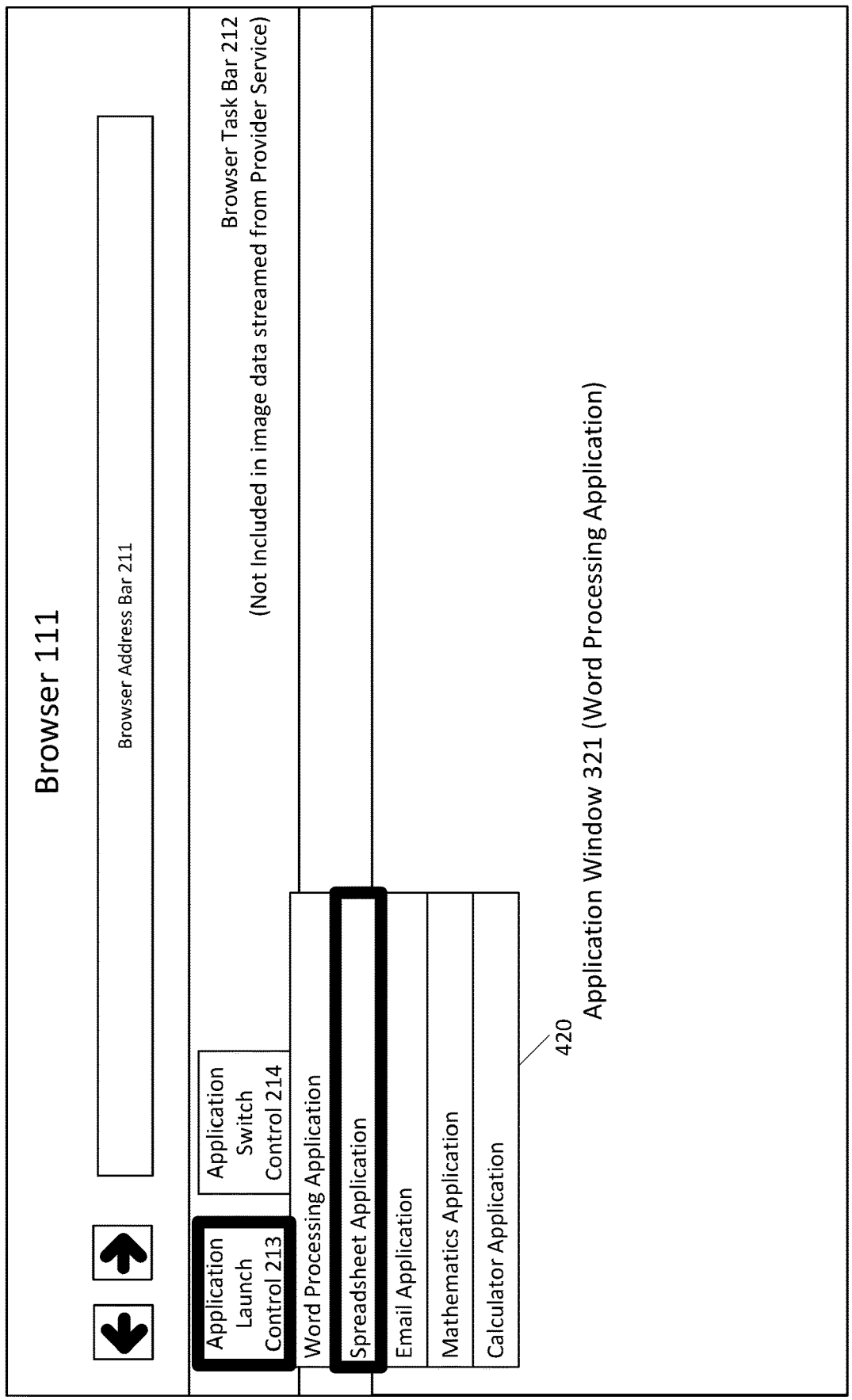
FIG. 4 is a diagram illustrating a first example application launch menu selection that may be used in accordance with the present disclosure.

In some examples, the browser 111 may provide a control that allows launching of applications while other launched applications are already being displayed by the browser. For example, while the application window 321 for the word processing application is being displayed by the browser, a user may determine that he wishes to launch another application, such as a spreadsheet application. Referring now to FIG. 4, it is seen that an application launch control 213 is provided on a browser task bar 212. It is noted that, in this example, the browser task bar 212, including controls 213 and 214 (described below), is not included in the image data 117 streamed from the provider service 120 and is not provided by the custom shell 123 on which the application windows are executed. As shown in FIG. 4, a user has selected application launch control 213 (as indicated by the bold border surrounding control 213), which, in turn, causes an application launch menu 420 to be displayed. As also shown in FIG. 4, the user has selected to launch the spreadsheet application (as indicated by the bold border surrounding the spreadsheet application option in menu 420). Selection of the spreadsheet application option in menu 420 may then cause the spreadsheet application to be launched and executed at provider service 120, for example using similar procedures as described above for launching of the word processing application and not repeated here.

The launching of spreadsheet application by provider service 120 may, in turn, cause a respective application window associated with the spreadsheet application to be launched for display of a user interface of the spreadsheet application. Image data associated with the spreadsheet application window may then be transmitted from provider service 120 to client 110 for display by browser 111. In particular, referring now to FIG. 5, an application window 521 associated with the launched and executing spreadsheet application is shown within browser 111. In some examples, upon launching and display of the spreadsheet application window 521, the word processing application window 321 of FIG. 3 may be hidden from view by the user, for example such that the word processing application does not interfere with or obstruct the display of the spreadsheet application window 521.

Figure 5:
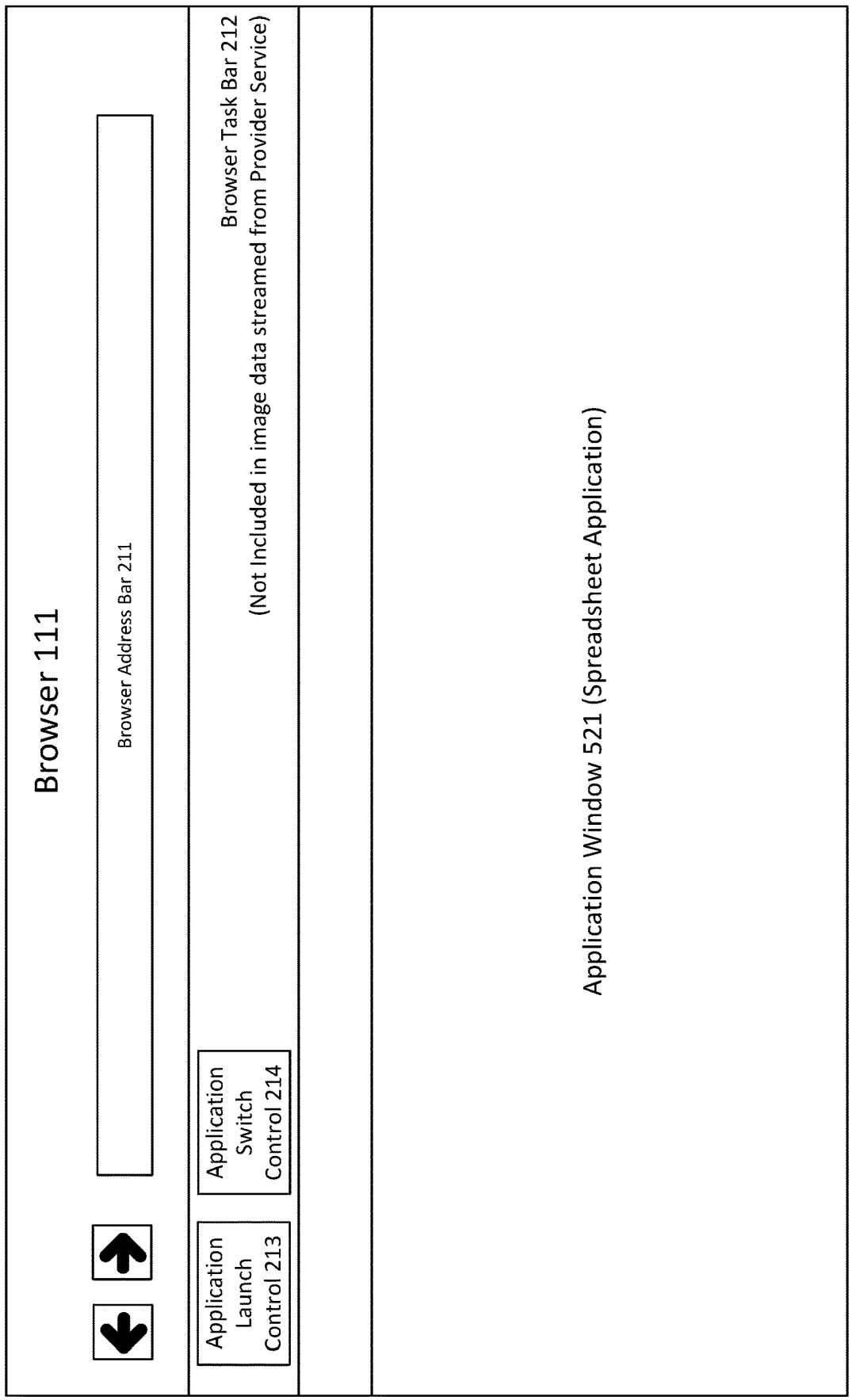
FIG. 5 is a diagram illustrating an example launched spreadsheet application window that may be used in accordance with the present disclosure.
Figure 6:
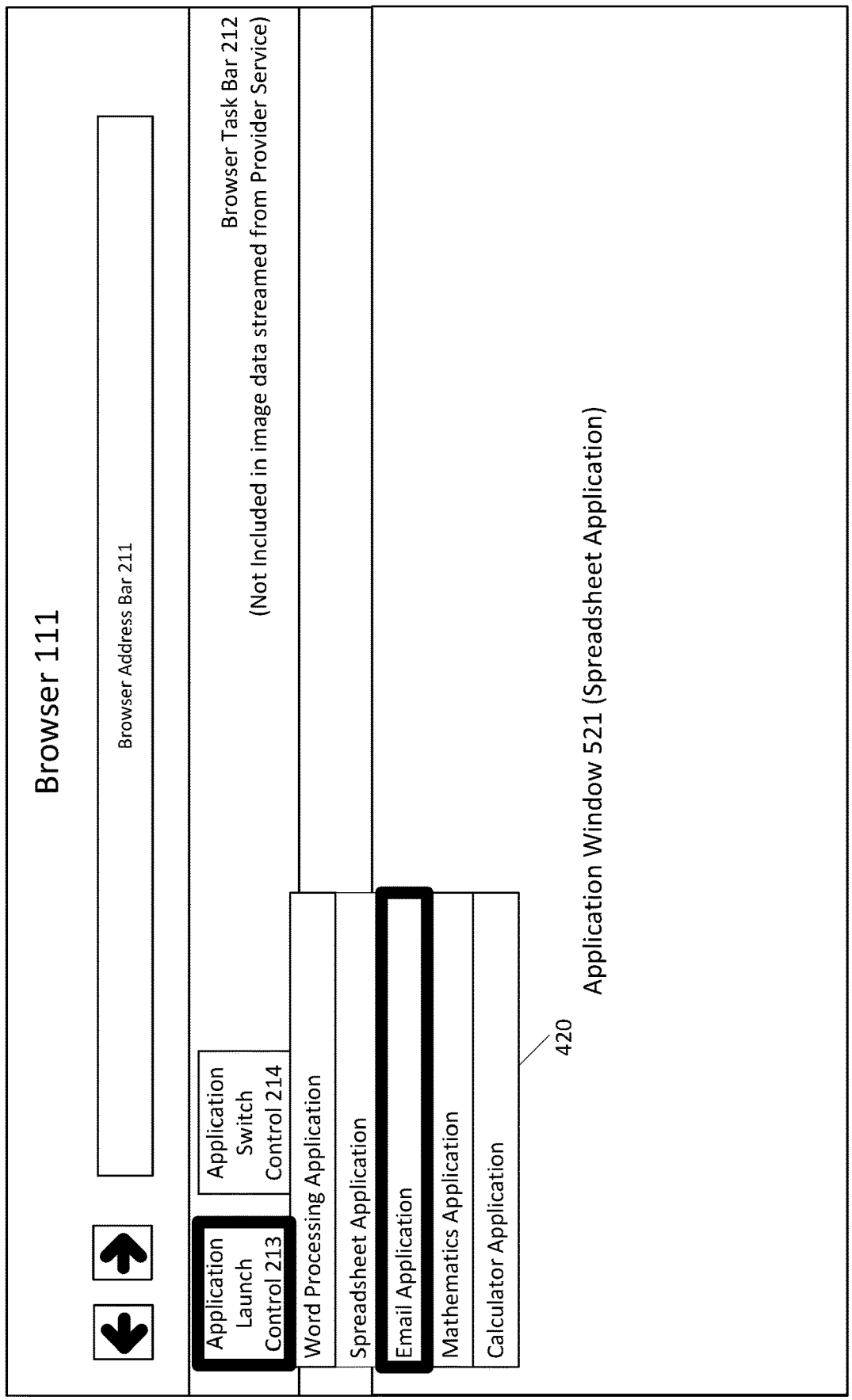
FIG. 6 is a diagram illustrating a second example application launch menu selection that may be used in accordance with the present disclosure.

As another example, in some cases, while the application window 521 for the spreadsheet application is being displayed by the browser 111, the user may determine that he wishes to launch an email application. Referring now to FIG. 6, it is seen that application launch control 213 may again be selected (as indicated by the bold border surrounding control 213), which, in turn, causes application launch menu 420 to again be displayed. As also shown in FIG. 6, the user has selected to launch the email application (as indicated by the bold border surrounding the email application option in menu 420). Selection of the email application option in menu 420 may then cause the email application to be launched and executed at provider service 120, for example using similar procedures as described above and not repeated here. The launching of the email application by provider service 120 may, in turn, cause a respective application window associated with the email application to be launched for display of a user interface of the email application. Image data associated with the email application window may then be transmitted from provider service 120 to client 110 for display by browser 111. In particular, referring now to FIG. 7, an application window 721 associated with the launched and executing email application is shown within browser 111. In some examples, upon launching and display of the email application window 721, the spreadsheet application window 521 of FIG. 5 may be hidden from view by the user, for example such that the spreadsheet application does not interfere with or obstruct the display of the email application window 721.

In some cases, a user may wish to switch from a currently displayed application window to an application window for another currently launched application. For example, in some cases, a user may wish to switch from the email application window 721 to the spreadsheet application window 521. As set forth above, in some traditional shell interfaces, a user may switch between launched applications using a task bar provided by the shell interface, such as by selecting an icon displayed in the task bar for the application to which the user wishes to switch. In some examples, however, the interface provided by custom shell 123 may not include a task bar that allows switching between launched applications. In these and other cases, browser 111 may provide a control that enables efficient switching between launched applications. For example, referring now to FIG. 8, it seen that browser 111 provides an application switch control 214 for switching between launched applications. In this example, application switch control 214 is not included in the image data 117 streamed from the provider service 120 and is not provided by the custom shell 123 on which the application windows are executed. Also, in this example, the application switch control 214 is included in the browser task bar 212 along with the application launch control 213 described above.

In some examples, upon selection of the application switch control 214, the browser 111 may generate input data indicating an application switching request for transmission to the provider service 120. In one specific example, the input data may include key data, such as relating to a hot-key combination (e.g., Ctrl+Shift+Alt+F10, etc.). It is noted, however, that the input data may include any input recognizable by the provider service 120 to indicate a request to switch application windows. In some examples, the input data indicating the switch request may be transmitted to the remote service using a built-in channel (e.g., a key input channel) of a streaming protocol that is employed for the computing session. It is noted, however, that the input data may be transmitted in other ways, such as using a custom channel of a streaming protocol or via other transmission techniques.

Referring back to FIG. 1, the input data indicating the switch request may be received at the provider service 120 by the streaming service 121. The switch request may then be provided to application switcher 125, which is a process that may manage the switching of application windows as described below. In some examples, application switcher 125 may process the switch request by determining the current launched application windows for the computing session 116, for example including both displayed and hidden application windows. For example, in the case of FIG. 8, the application switch control is selected while the email application window 721 is currently displayed by browser 111. Thus, in the case of FIG. 8, email application window 721 is the only currently displayed application window in the computing session 116. As described above, however, the computing session 116 also includes word processing application window 321 and spreadsheet application window 521, which are currently hidden in FIG. 8.

Figure 7:
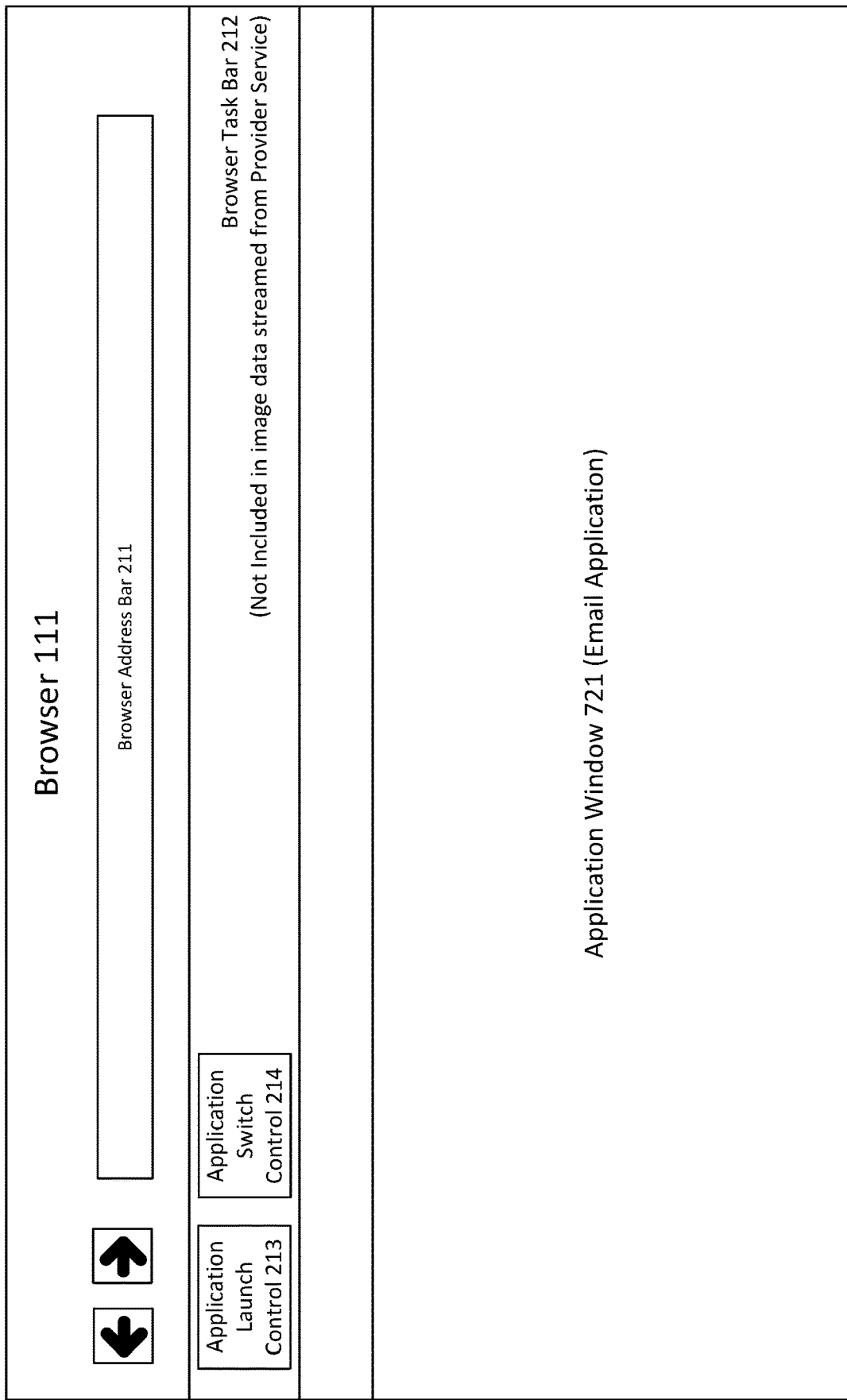
FIG. 7 is a diagram illustrating an example launched email application window that may be used in accordance with the present disclosure.

In some examples, current displayed windows may be easily determined, for example based on information provided by the custom shell 123 and/or other components. By contrast, in some examples, identification of currently hidden windows may be a more complex determination. In some cases, in order to determine the current hidden application windows, the application switcher 125 may maintain a hidden window list 127 that indicates currently hidden windows within the computing session 116. The application switcher 125 may, for example, monitor the computing session 116 to detect when application windows become hidden and to responsively add the hidden application windows to the hidden window list 127. For example, as described above, upon launching and display of the spreadsheet application window 521 as shown in FIG. 5, the word processing application window 321 displayed in FIGS. 3-4 may become hidden. In some examples, the application switcher 125 may detect when the word processing application window 321 becomes hidden and responsively add the word processing application window 321 to the hidden window list 127. As also described above, upon launching and display of the email application window 721 as shown in FIG. 7, the spreadsheet application window 521 displayed in FIGS. 5-6 may become hidden. In some examples, the application switcher 125 may detect when the spreadsheet application window 521 becomes hidden and responsively add the spreadsheet application window 521 to the hidden window list 127.

In some examples, upon determining the current launched application windows, the application switcher 125 may request selectable representations, such as thumbnail or other reduced size images, of the launched application windows for display to the user. For example, in some cases, the representations of the application windows may be provided by a window management interface 126. In particular, in some examples, window management interface 126 may expose an application programming interface (API) including one or more calls that allow particular launched windows to be identified and that allow representations, such as thumbnail images, of the identified windows to be generated and provided upon request. As set forth above, in some examples, the application switcher 125 may determine not to request representations for certain launched application windows, such as pop-up windows, error message windows, and other windows that the user may be considered unlikely to switch to. It is also noted that, in some examples, there may be multiple launched application windows associated with a single particular application, and, in some examples, multiple representations for these multiple application windows may also be generated for the single particular application, thereby also potentially allowing switching between different application windows for the same application.

Upon generation of the representations of the launched application windows, the application switcher 125 may generate a display of the representations, such as a display in which the representations are shown in a grid, tile, flip or other layout. In some examples, the application switcher 125 may generate the display by applying the representations to a list control associated with a grid, tile, flip or other layout. The display of the representations may then be streamed from the provider service 120 to the client 110 for display by the browser 111.

Figure 9:
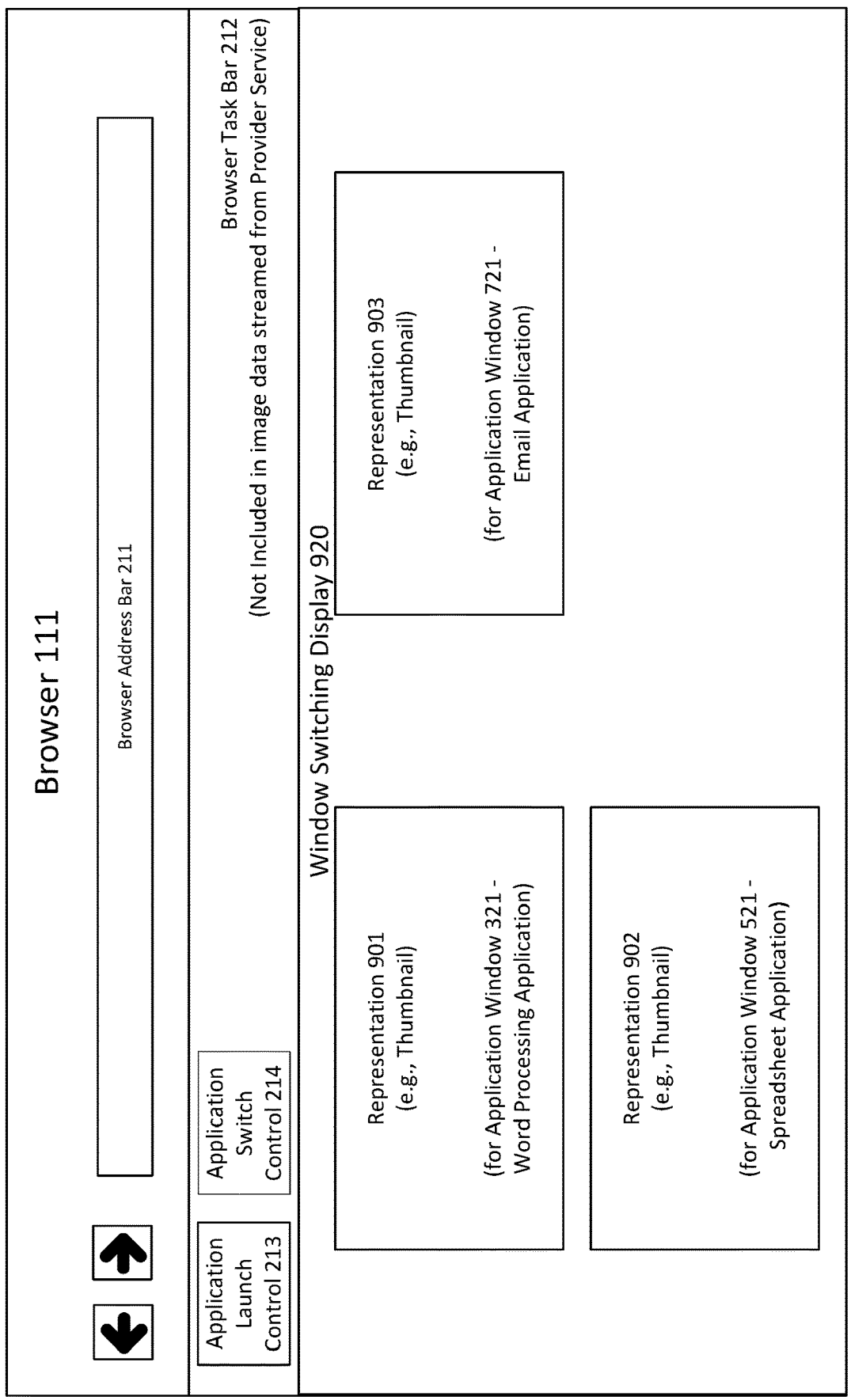
FIG. 9 is a diagram illustrating an example display of selectable application window representations that may be used in accordance with the present disclosure.

Referring now to FIG. 9, it is seen that selection of the application switch control 214 results in generation of window switching display 920, which includes representations (e.g., thumbnails) 901-903. In particular, representation 901 is associated with word processing application window 321, representation 902 is associated with spreadsheet application window 521, and representation 903 is associated with email application window 721. Each of the representations 901-903 may be selectable by a user, for example via a mouse, touchscreen or other input control, to request display of a respective associated application window. In the example of FIG. 9, representations 901-903 are shown in a grid layout. It is noted, however, that a grid layout is merely one example layout for the application windows and that other layouts (e.g., tile, flip, etc.) may also be employed. It is also noted that there is no requirement that a representation display must simultaneously and/or concurrently display all generated representations to the user, and that the user may navigate to display different representations using any appropriate inputs.

Figure 10:
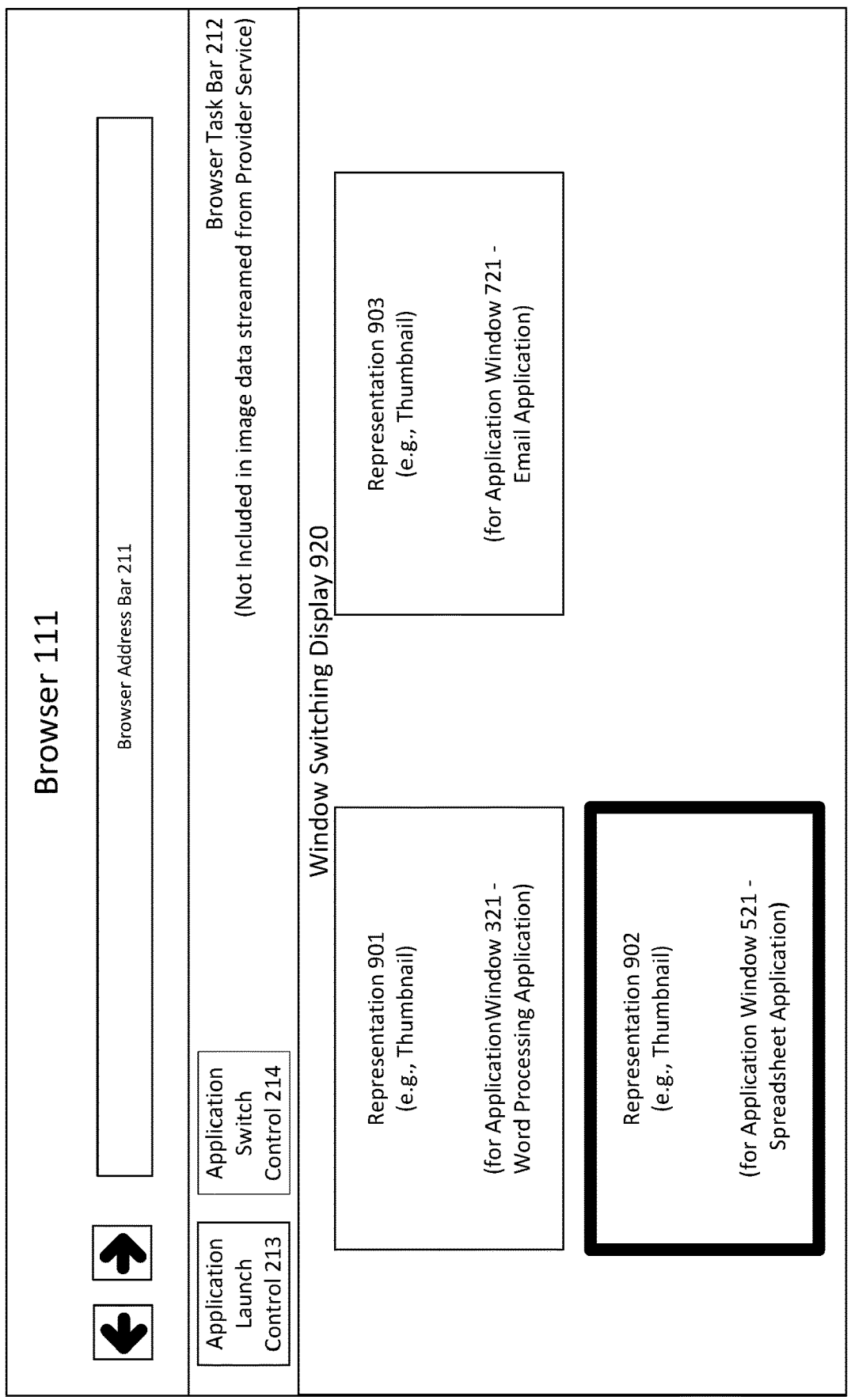
FIG. 10 is a diagram illustrating an example application window representation selection that may be used in accordance with the present disclosure.
Figure 11:
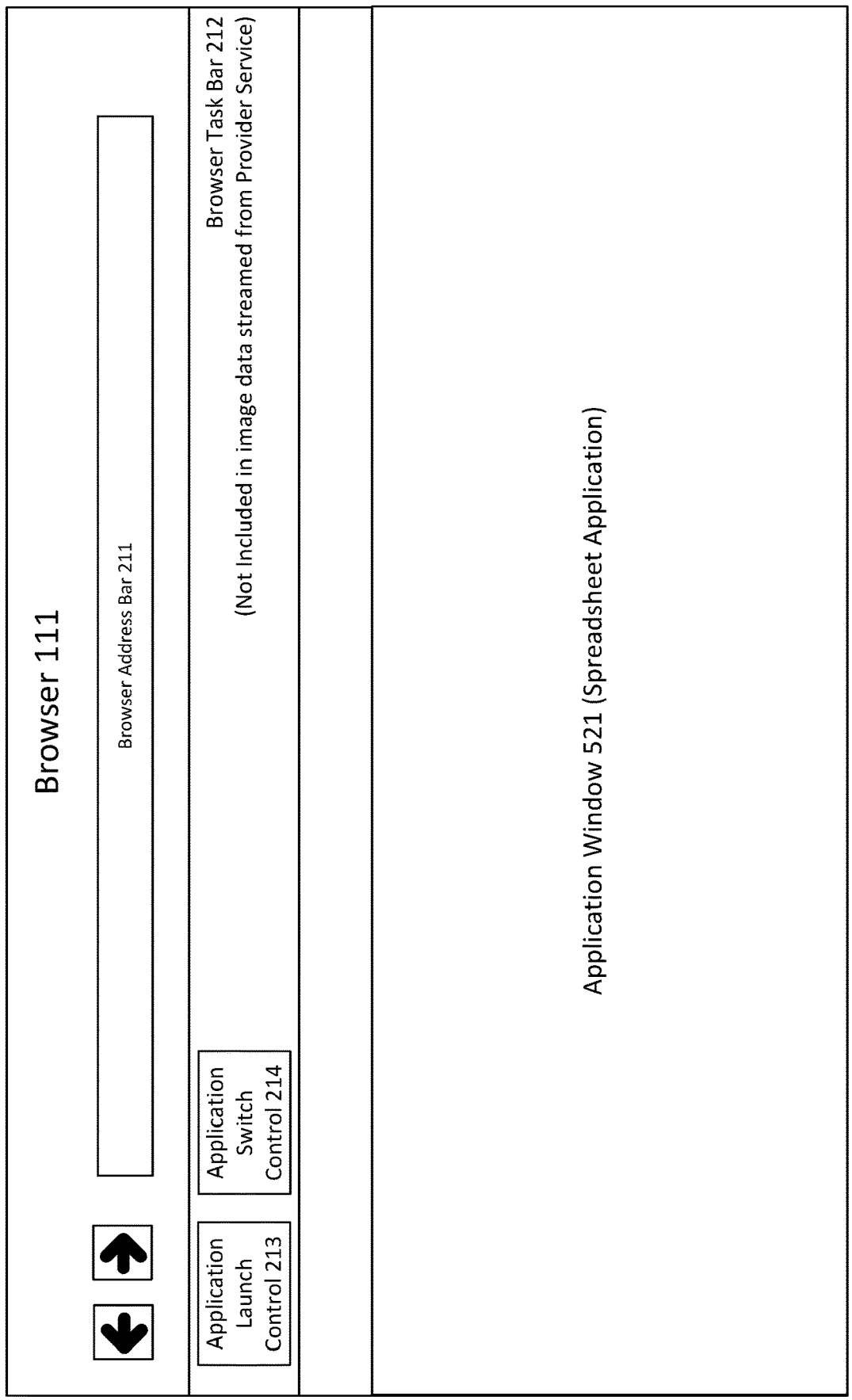
FIG. 11 is a diagram illustrating an example switched-to application window that may be used in accordance with the present disclosure.

Referring now to FIG. 10, it is seen that a user has selected representation 902 associated with spreadsheet application window 521 (as indicated by the bold border surrounding representation 902). In some examples, input data indicating the selection of representation 902 may then be transmitted to the provider service 120. Upon receipt of this input data, the provider service 120 may generate a display including the spreadsheet application window 521 corresponding to the selected representation 902. This display may then be then be transmitted from the provider service 120 to the client 110 for display by the browser 111. Referring now to FIG. 11, it is seen that application window 521 associated with the spreadsheet application is again displayed in browser 111 in response to the selection of representation 902 as depicted in FIG. 10. The user may then interact with application window 521 to perform functionality associated with the spreadsheet application.

Thus, as described above, the application switch control 214 provided by browser 111 may, in some examples, be used to switch between application windows. It is also noted that, in some examples, the application switch control may operate as a toggle control that allows the window switching display 920 to be presented via browser 111 and that also allows the browser 111 to return to a previously displayed application window. For example, referring now to FIG. 12, it is seen that the application switch control 214 may also be selecting during presentation of the window switching display 920 by browser 111 (as indicated by the bold outline surrounding application switch control 214). In some examples, selection of application switch control 214 during presentation of the window switching display 920 may cause the browser to return to the previously displayed application window. In particular, referring now to FIG. 13, it is seen that selection of application switch control 214 during presentation of the window switching display 920 has caused the browser 111 to re-display the email application window 721, which was displayed by the browser 111 prior to the window switching display 920 when the application switch control 214 was first selected.

Figure 14A:
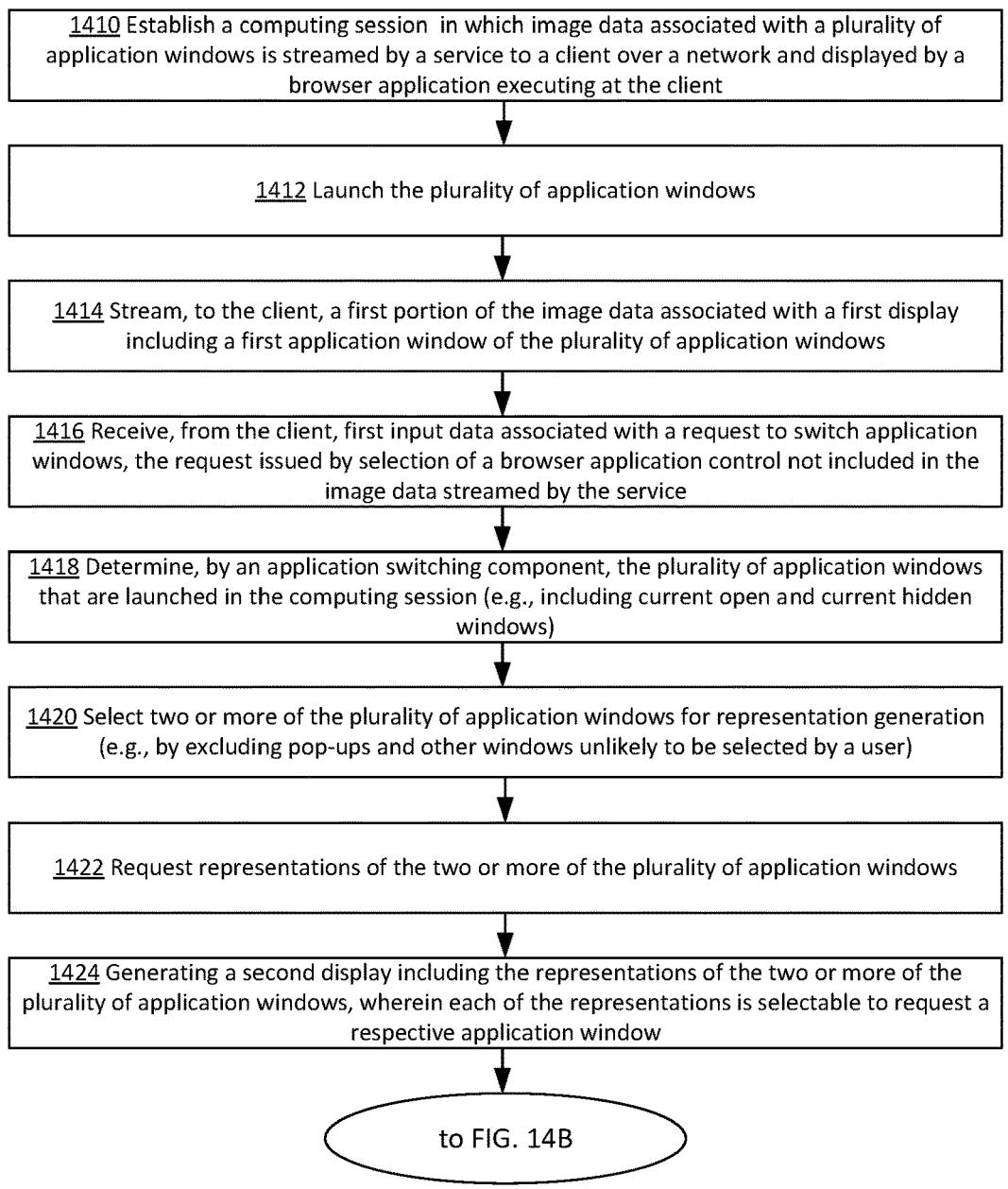
FIGS. 14A-B are flowcharts illustrating an example process for window switching for a networked computing session that may be used in accordance with the present disclosure.
Figure 14B:
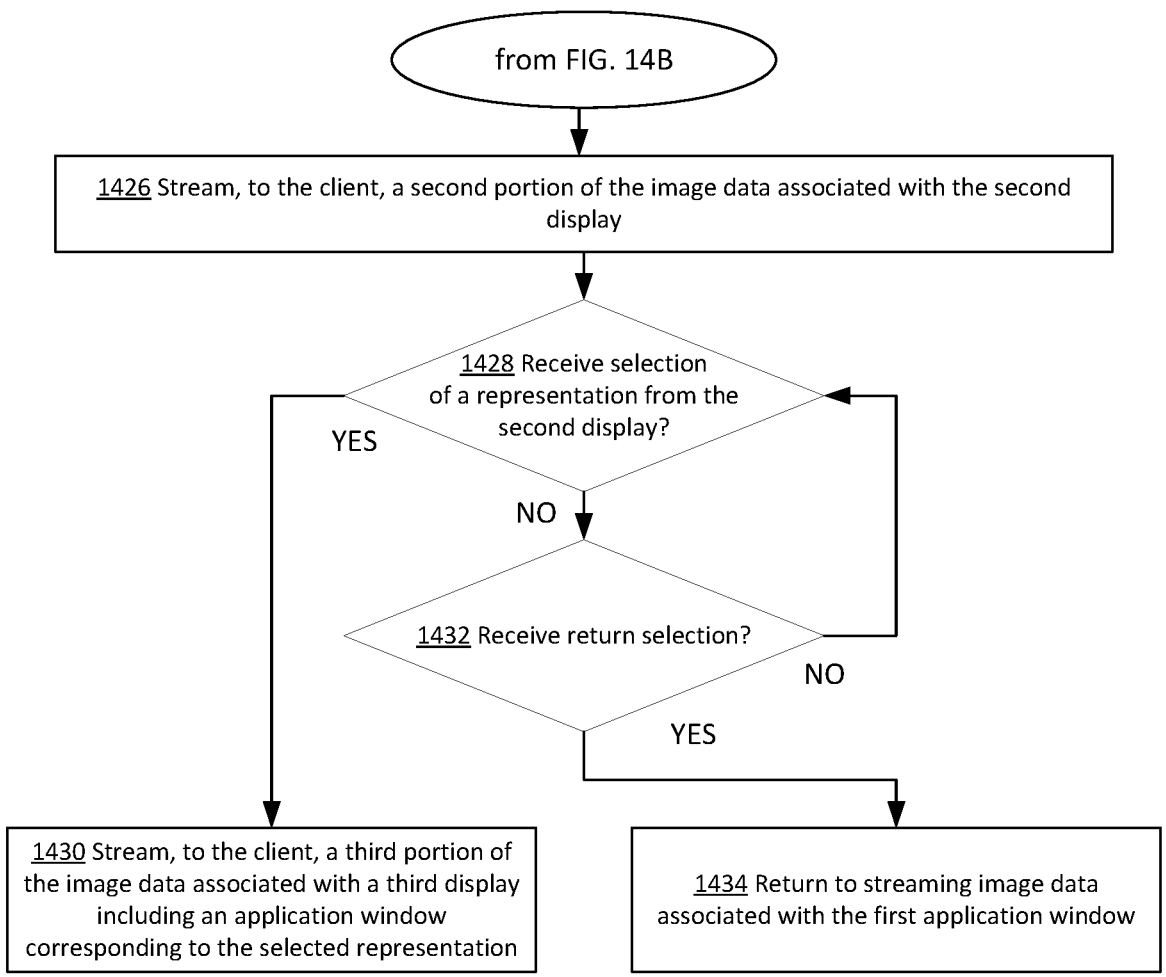

FIGS. 14A-B are flowcharts illustrating an example process for window switching for a networked computing session that may be used in accordance with the present disclosure. As shown, the process is started at operation 1410, at which a computing session is established in which image data associated with a plurality of application windows is streamed by a service to a client over a network and displayed by a browser application executing at the client. As set forth above, in some examples, the computing session may be established by navigating the client browser application to an Internet Protocol (IP) or other address associated with the service, such as an address that may be entered into an address bar of the browser application. As also set forth above, identity authentication information for a user, such as a username and password, may also be entered via the browser application and transmitted to the service, such as to verify the identity of the user and to determine various applications and other computing resources that are accessible to the user.

At operation 1412, the plurality of application windows are launched by the service. As set forth above, in some examples, a user may issue a request to launch an application, such as by selecting a respective application icon 201-205 via the application selection display 220 of FIG. 2 or by selecting a respective application menu option via the application selection menu 420 of FIGS. 4 and 6. The browser application may then transmit the application launch request including an application identifier associated with the respective selected application to the service. In some examples, the service may then retrieve a path and other information associated with the selected application and launch the selected application. Additionally, the service may launch an application window in which a user interface for the selected application is displayed.

At operation 1414, a first portion of the image data is streamed to the client. The first portion of the image data is associated with a first display including a first application window of the plurality of application windows. As set forth above, the image data may include, for example, pixel value data that is transmitted to the client using a streaming data transmission protocol. Upon receiving the first portion of the image data, the browser application may display the first display including the first application window. For example, as shown in FIG. 7, an application window 721 associated with an email application may be displayed in browser 111.

Figure 8:
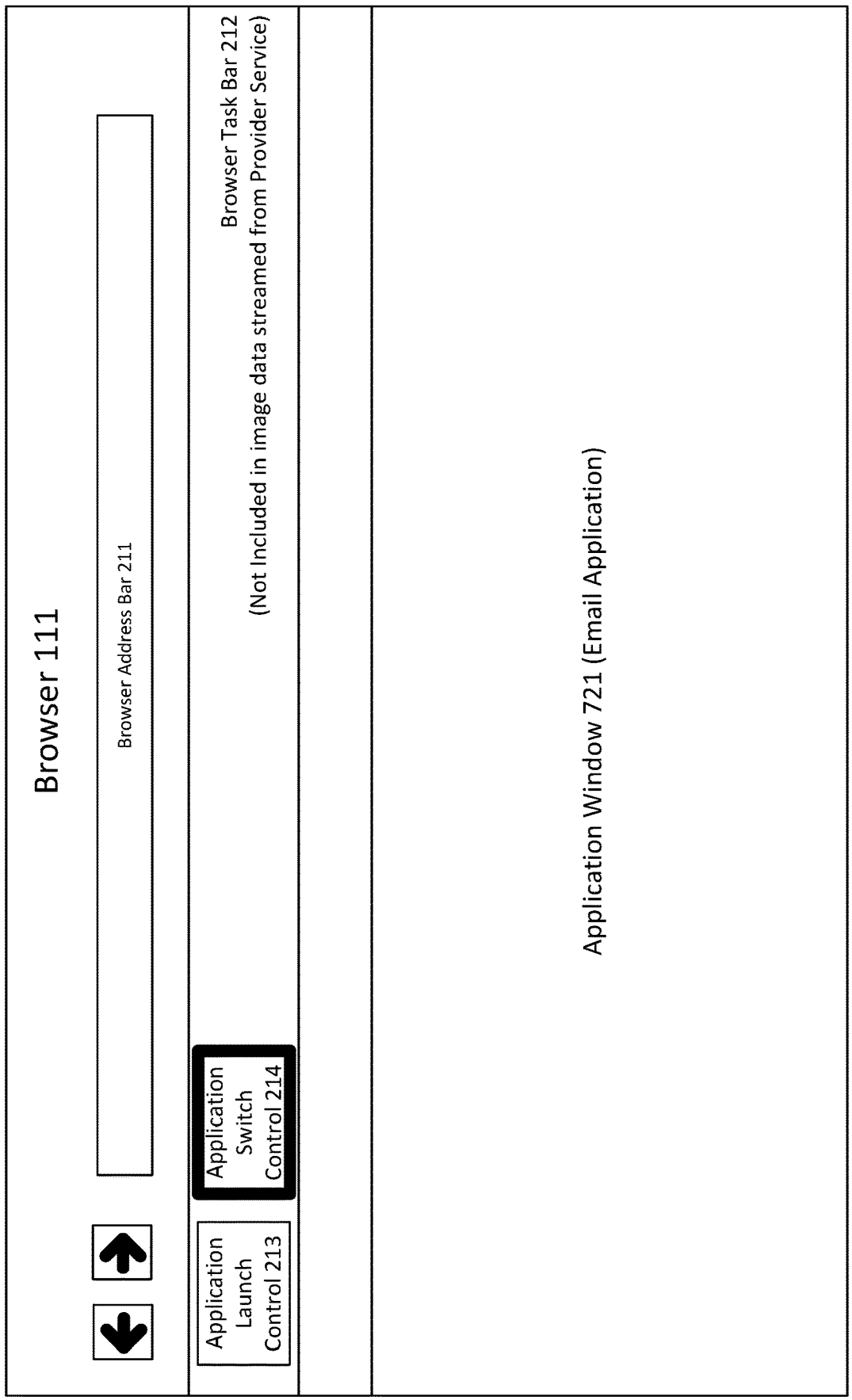
FIG. 8 is a diagram illustrating an example application switch control selection that may be used in accordance with the present disclosure.

At operation 1416, first input data associated with a request to switch application windows is received from the client. In some examples, the request may be issued by selection of a browser application control not included in the image data streamed by the service and not provided by the custom shell 123 on which the application windows are executed. For example, as shown in FIG. 8, application switch control 214 is selected by a user in order to request switching the display from email application window 721 to another application window. As set forth above, application switch control 214 is not included in the image data streamed by the service and is not provided by the custom shell 123 on which the application windows are executed. Rather, the application switch control 214 is instead included in a browser task bar 212 separate from the streamed content. In some examples, upon receiving a selection of the application switch control 214, the client browser application may generate and transmit input data associated with the application switching request to the service. In one specific example, the input data may include key data, such as relating to a hot-key combination (e.g., Ctrl+Shift+Alt+F10, etc.) generated by the browser application in response to selection of the application switch control 214. Also, in some examples, the input data may be transmitted to, and received by, the service over a built-in channel (e.g., a key input channel) of a streaming protocol that is used to transmit the image data.

At operation 1418, an application switching component may determine the plurality of application windows that are launched in the computing session. In some examples, this may include determining one or more application windows that are currently displayed and determining one or more application windows that are currently hidden. As set forth above, in some examples, the one or more currently displayed application windows may be determined based on information provided by the custom shell 123 and/or other components. Additionally, in some examples, the one or more currently hidden application windows may be determined based, at least in part, on a maintained list of hidden windows. The application switching component may, for example, monitor the computing session to detect when application windows become hidden and to responsively add the hidden application windows to the hidden window list.

At operation 1420, two or more of the plurality of application windows are selected for representation generation. As set forth above, in some examples, all of the launched application windows, such as may include both displayed and hidden application windows, may be selected for representation generation. By contrast, in some examples, a determination may be made to exclude certain launched application windows, such as pop-up windows, error message windows, and other windows that the user may be considered unlikely to switch to, from the two or more application windows for which representations are displayed. It is also noted that, in some examples, there may be multiple launched application windows associated with a single particular application, and, in some examples, multiple representations for these multiple application windows may also be generated for the single particular application, thereby also potentially allowing switching between different application windows for the same application.

At operation 1422, representations, such as thumbnail images, of the two or more of the plurality of application windows may be requested. For example, in some cases, the representations of the application windows may be requested from, and provided by, a window management interface. In some examples, the window management interface may expose an application programming interface (API) including one or more calls that allow particular launched windows to be identified and that allow representations, such as thumbnail images, of the identified windows to be generated and provided upon request. In some examples, the application switching component may issue one or more API calls identifying the two or more selected application windows and requesting the representations.

At operation 1424, a second display is generated including the representations of the two or more of the plurality of application windows. In some examples, the second display may show the representations using a grid, tile, flip or other layout. In some examples, the application switcher 125 may generate the display by applying the representations to a list control associated with a grid, tile, flip or other layout. Each of the representations may be selectable to request a respective application window. At operation 1426, a second portion of the image data associated with the second display is streamed to the client, and the second display may be displayed by the client browser application. For example, FIGS. 9 and 10 show a display of representations in an example grid layout.

At operation 1428, it is determined whether a selection of one of the representations from the second display is received. If so, then the process proceeds to operation 1430, at which a third portion of the image data associated with a third display including an application window corresponding to the selected representation is streamed to the client. The third display is then displayed by the client upon receipt of the third portion of image data. For example, in FIG. 10, representation 902 is selected to request the respective spreadsheet application window 521. As shown in FIG. 11, this causes the spreadsheet application window 521 to be displayed by browser 111.

Figure 12:
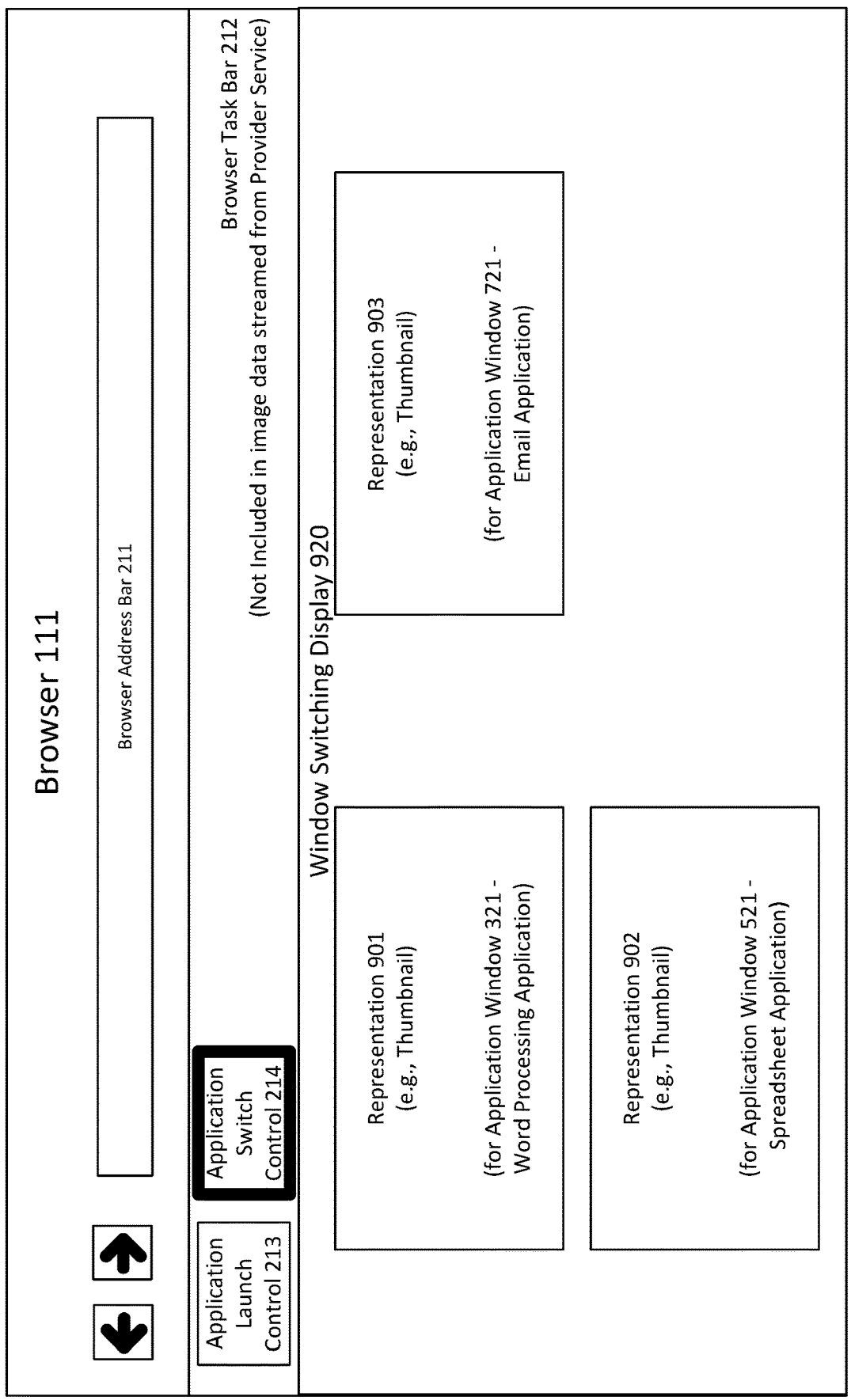
FIG. 12 is a diagram illustrating an example selection to remove display of selectable application window representations that may be used in accordance with the present disclosure.
Figure 13:
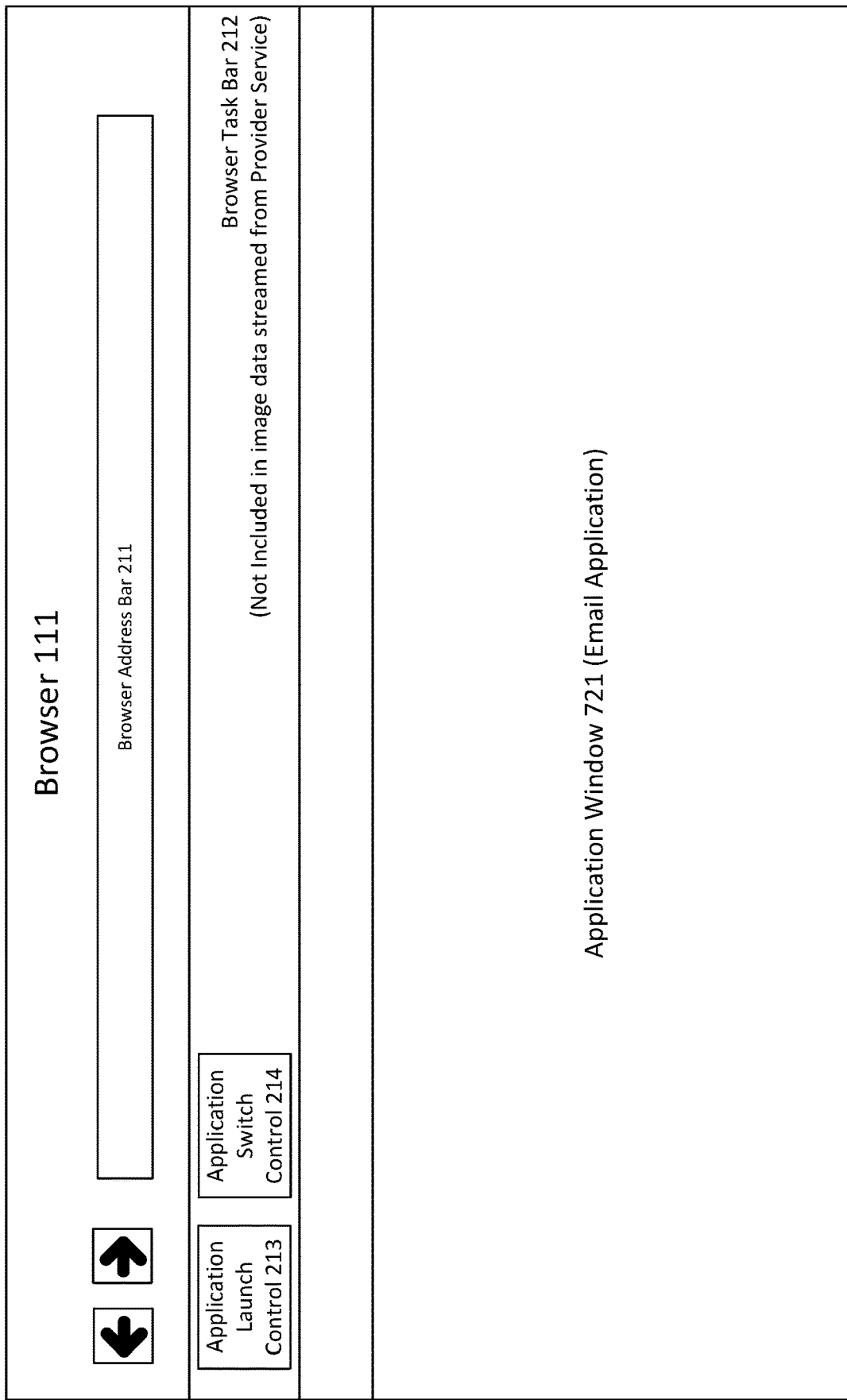
FIG. 13 is a diagram illustrating an example resumed display of a launched email application window that may be used in accordance with the present disclosure.

If a selection of one of the representations from the second display is not received, then the process proceeds to operation 1432, at which it is determined whether a return selection is received to remove the second display and return to the previous display of the first application window. For example, as shown in FIG. 12, the application switch control may be a toggle control, and selection of the application switch control 214 during the representation display may cause a return to the previously displayed application window. If a return selection is received, then at operation 1434, the service returns to streaming image data associated with the first application window. For example, as shown in FIG. 13, the browser 111 returns to a display of the email application window 721. If, at operation 1432, a return selection is not received, then the process may loop back to operation 1428.

Figure 15:
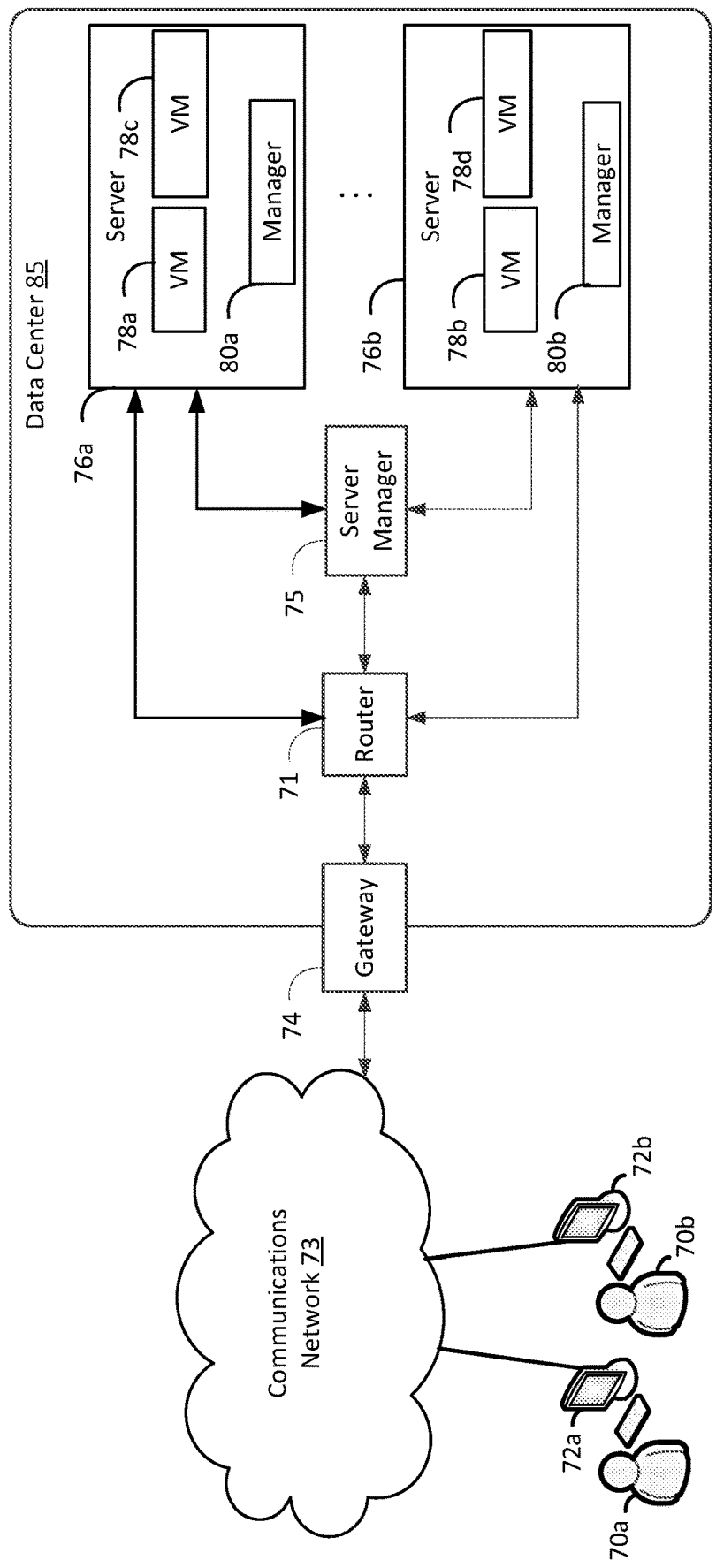
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76a and 76b. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
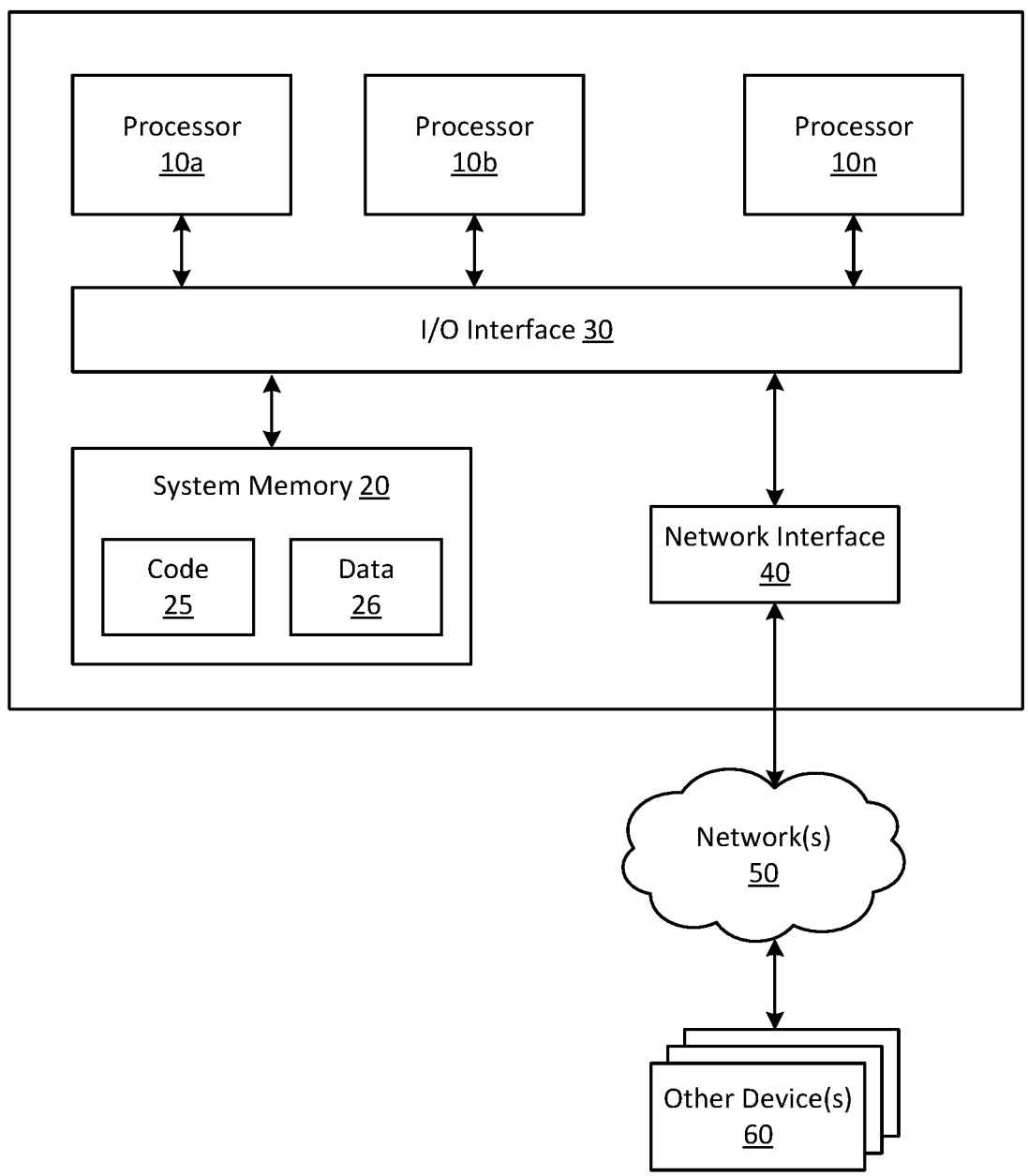
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for window switching comprising:
one or more processors; and
one or more memories having stored therein instructions that, upon execution by the one or more processors, cause the computing system to perform operations comprising:
launching a plurality of application windows for a computing session in which image data associated with the plurality of application windows is streamed by a service to a client over a network and displayed by a browser application executing at the client;
streaming, to the client by the service, a first portion of the image data associated with a first display including a first application window of the plurality of application windows;
receiving, by the service from the client, first input data associated with a request to switch application windows, the request issued by selection of a control of the browser application not included in the image data streamed by the service, wherein the service determines two or more currently launched application windows of the plurality of application windows, including one or more displayed application windows that are displayed in the browser application and one or more hidden application windows, the one or more hidden application windows being determined based, at least in part, on a list of hidden application windows maintained by the service, the one or more displayed application windows including the first application window;
streaming, to the client by the service, over the network, a second portion of the image data associated with a second display generated remotely from the client and including thumbnail images of the determined two or more currently launched application windows according to the request to switch application windows, wherein each of the thumbnail images is selectable to request a respective application window;
receiving, by the service from the client, second input data associated with a selection of a thumbnail image of a second application window of the plurality of application windows; and
streaming, to the client by the service, a third portion of the image data associated with a third display including the second application window.

2. The computing system of claim 1, wherein the first input data comprises key data generated by the browser application in response to selection of the control of the browser application.

3. The computing system of claim 1, wherein the operations further comprise issuing one or more application programming interface (API) calls identifying the determined two or more currently launched application windows and requesting the thumbnail images.

4. The computing system of claim 1, wherein the operations further comprise generating the second display by applying the thumbnail images to a list control associated with a layout.

5. The computing system of claim 1, wherein the first input data is received over a channel of a streaming protocol used to transmit the image data.

6. A computer-implemented method comprising:
launching a plurality of application windows for a computing session in which image data associated with the plurality of application windows is streamed by a service to a client over a network and displayed by a browser application executing at the client;

streaming, to the client by the service, a first portion of the image data associated with a first display including a first application window of the plurality of application windows;

receiving, by the service from the client, first input data associated with a request to switch application windows, the request issued by selection of a control of the browser application not included in the image data streamed by the service, wherein the service determines two or more currently launched application windows of the plurality of application windows, including one or more displayed application windows that are displayed in the browser application and one or more hidden application windows, the one or more hidden application windows being determined based, at least in part, on a list of hidden application windows maintained by the service, the one or more displayed application windows including the first application window;

streaming, to the client by the service, over the network, a second portion of the image data associated with a second display generated remotely from the client and including thumbnail images of the determined two or more currently launched application windows according to the request to switch application windows, wherein each of the thumbnail images is selectable to request a respective application window;

receiving, by the service from the client, second input data associated with a selection of a thumbnail image of a second application window of the plurality of application windows; and streaming, to the client by the service, a third portion of the image data associated with a third display including the second application window.

7. The computer-implemented method of claim 6, wherein the first input data comprises key data generated by the browser application in response to selection of the control of the browser application.

8. The computer-implemented method of claim 6, further comprising issuing one or more application programming interface (API) calls identifying the determined two or more currently launched application windows and requesting the thumbnail images.

9. The computer-implemented method of claim 6, further comprising generating the second display by applying the thumbnail images to a list control associated with a layout.

10. The computer-implemented method of claim 6, wherein the first input data is received over a channel of a streaming protocol used to transmit the image data.

11. One or more non-transitory computer-readable storage media having stored thereon instructions that, upon execution by one or more computing devices, cause the one or more computing devices to perform operations comprising:

launching a plurality of application windows for a computing session in which image data associated with the plurality of application windows is streamed by a service to a client over a network and displayed by a browser application executing at the client;

streaming, to the client by the service, a first portion of the image data associated with a first display including a first application window of the plurality of application windows;

receiving, by the service from the client, first input data associated with a request to switch application windows, the request issued by selection of a control of the browser application not included in the image data streamed by the service, wherein the service determines two or more currently launched application windows of the plurality of application windows, including one or more displayed application windows that are displayed in the browser application and one or more hidden application windows, the one or more hidden application windows being determined based, at least in part, on a list of hidden application windows maintained by the service, the one or more displayed application windows including the first application window;

streaming, to the client by the service, over the network, a second portion of the image data associated with a second display generated remotely from the client and including thumbnail images of the determined two or more currently launched application windows according to the request to switch application windows, wherein each of the thumbnail images is selectable to request a respective application window;

receiving, by the service from the client, second input data associated with a selection of a thumbnail image of a second application window of the plurality of application windows; and streaming, to the client by the service, a third portion of the image data associated with a third display including the second application window.

12. The one or more non-transitory computer-readable storage media of claim 11, wherein the first input data comprises key data generated by the browser application in response to selection of the control of the browser application.

13. The one or more non-transitory computer-readable storage media of claim 11, wherein the operations further comprise issuing one or more application programming interface (API) calls identifying the determined two or more currently launched application windows and requesting the thumbnail images.

14. The one or more non-transitory computer-readable storage media of claim 11, wherein the operations further comprise generating the second display by applying the thumbnail images to a list control associated with a layout.

15. The one or more non-transitory computer-readable storage media of claim 11, wherein the first input data is received over a channel of a streaming protocol used to transmit the image data.

* * * * *